June 1, 1954

E. M. SALIBA 2,679,987

CABLE REELING APPARATUS

Filed April 4, 1951

5 Sheets-Sheet 1

June 1, 1954

E. M. SALIBA 2,679,987

CABLE REELING APPARATUS

Filed April 4, 1951

5 Sheets-Sheet 5

INVENTOR.
Edward M. Saliba.
BY
Kenway, Jenney, Witter & Hildreth.
Atty.

Patented June 1, 1954

2,679,987

UNITED STATES PATENT OFFICE 2,679,987

CABLE REELING APPARATUS

Edward M. Saliba, Andover, Mass.

Application April 4, 1951, Serial No. 219,223

7 Claims. (Cl. 242—66)

My invention relates to apparatus for reeling and measuring cable, wire, rope and the like. The apparatus of my invention may be employed with equal facility as a machine for dispensing cable from one of a bank of reels or for re-spooling, coiling and other operations.

The most important object of my invention is to decrease the time, space and cost of handling materials such as cable, rope, and the like.

Another object of the invention is to provide apparatus capable of forming coils of desired length of any of a large variety of cable sizes and types.

Still another object of the invention is to provide portable apparatus capable of reeling or coiling cable and the like upon a large variety of reel types.

An important feature of the invention resides in a reel driving device including a pair of variable face driving pulleys adjustable to fit reels of different diameters and thickness.

Another feature of the invention resides in a fleeting mounted measuring unit and counter arranged in combination with the driving pulleys for automatically measuring the length of the cable and simultaneously reeving the cable in properly tiered array upon a reel.

Another feature of the invention resides in a reel having a demountable rim or flange, in combination with means for securing the reel in position for winding and for stripping a wound coil from the reel.

Figure 1:
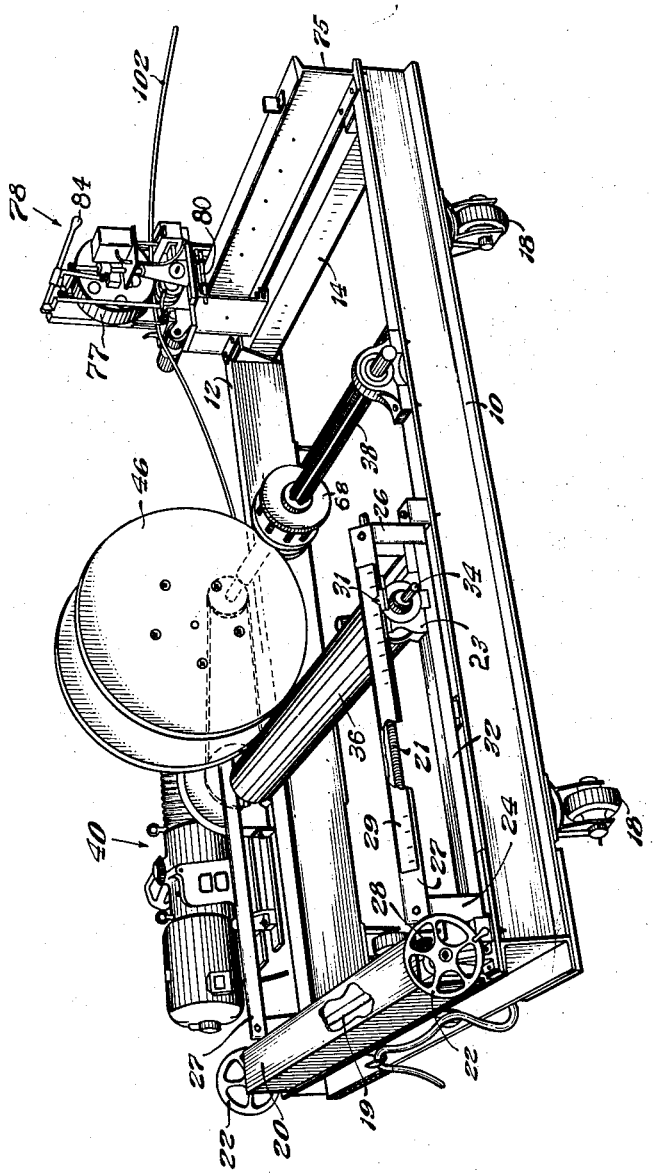
Figure 2:
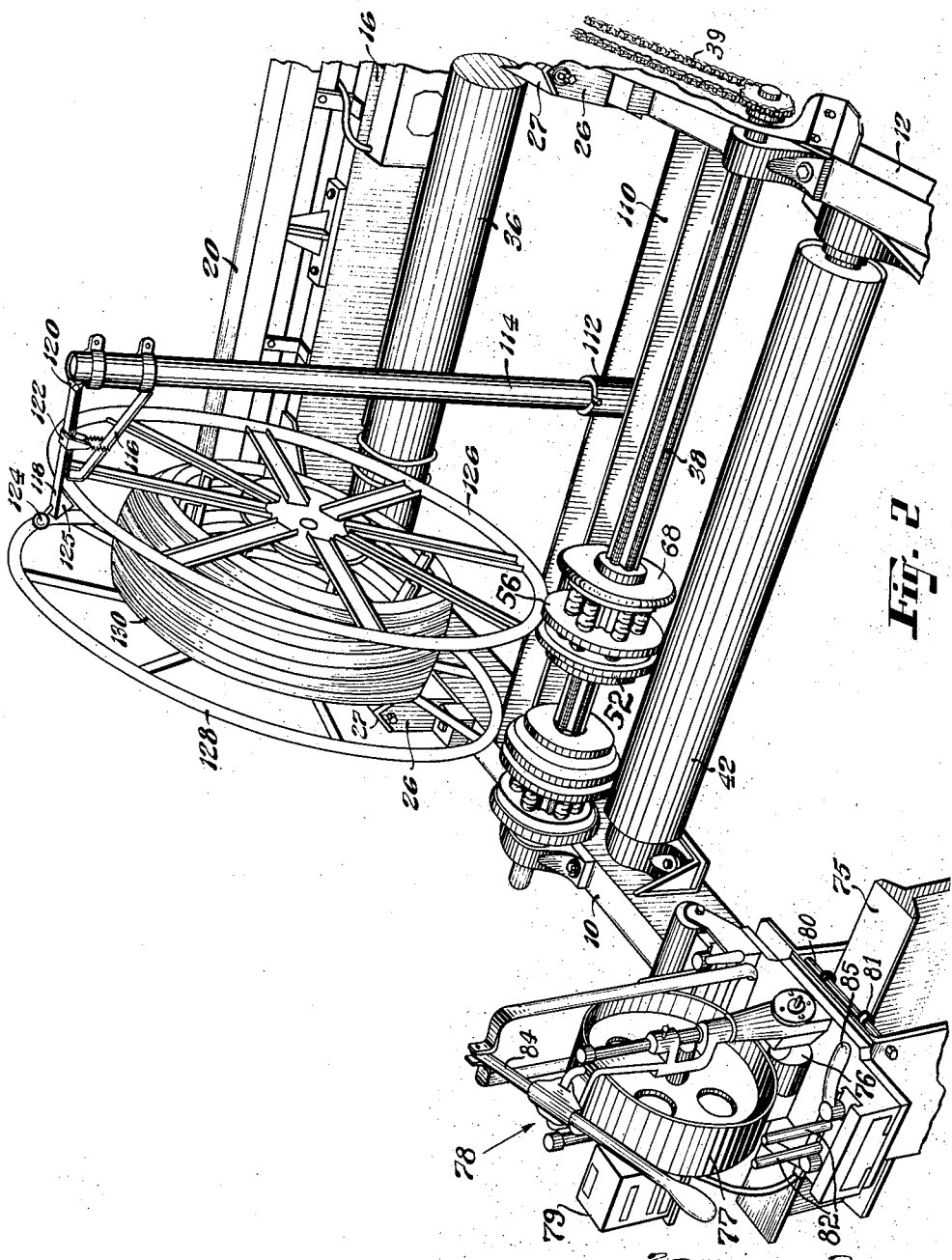
Figure 3:
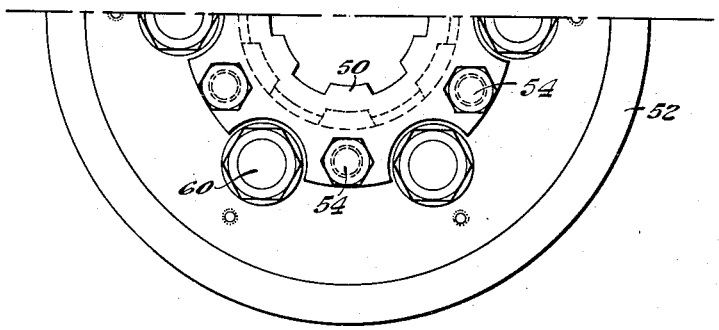
Figure 4:
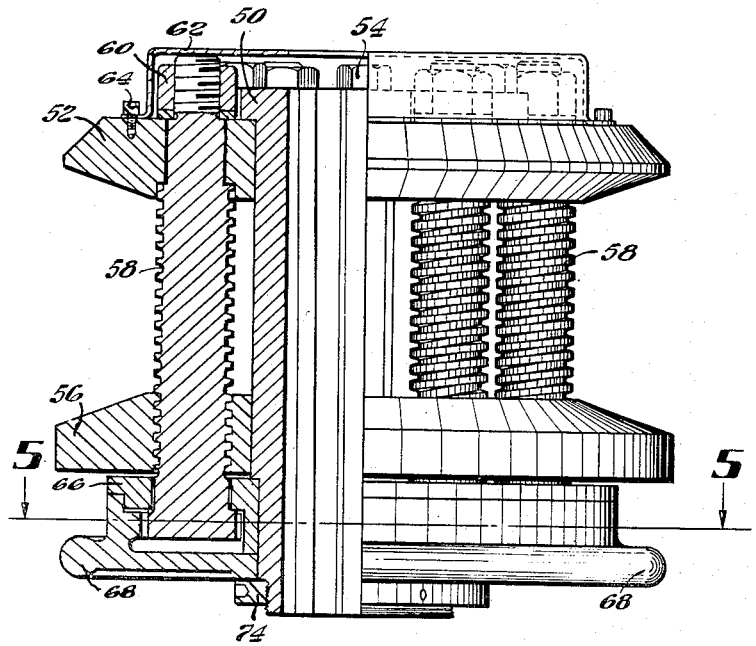
Figure 5:
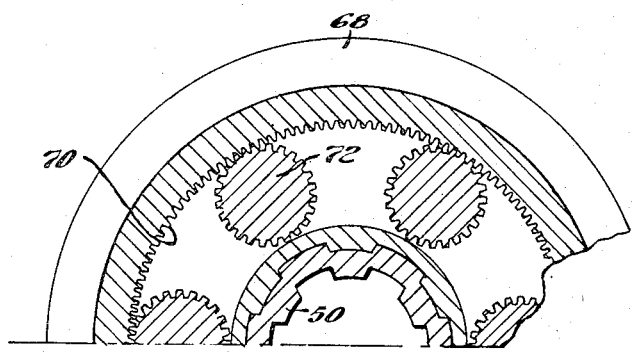
Figure 6:
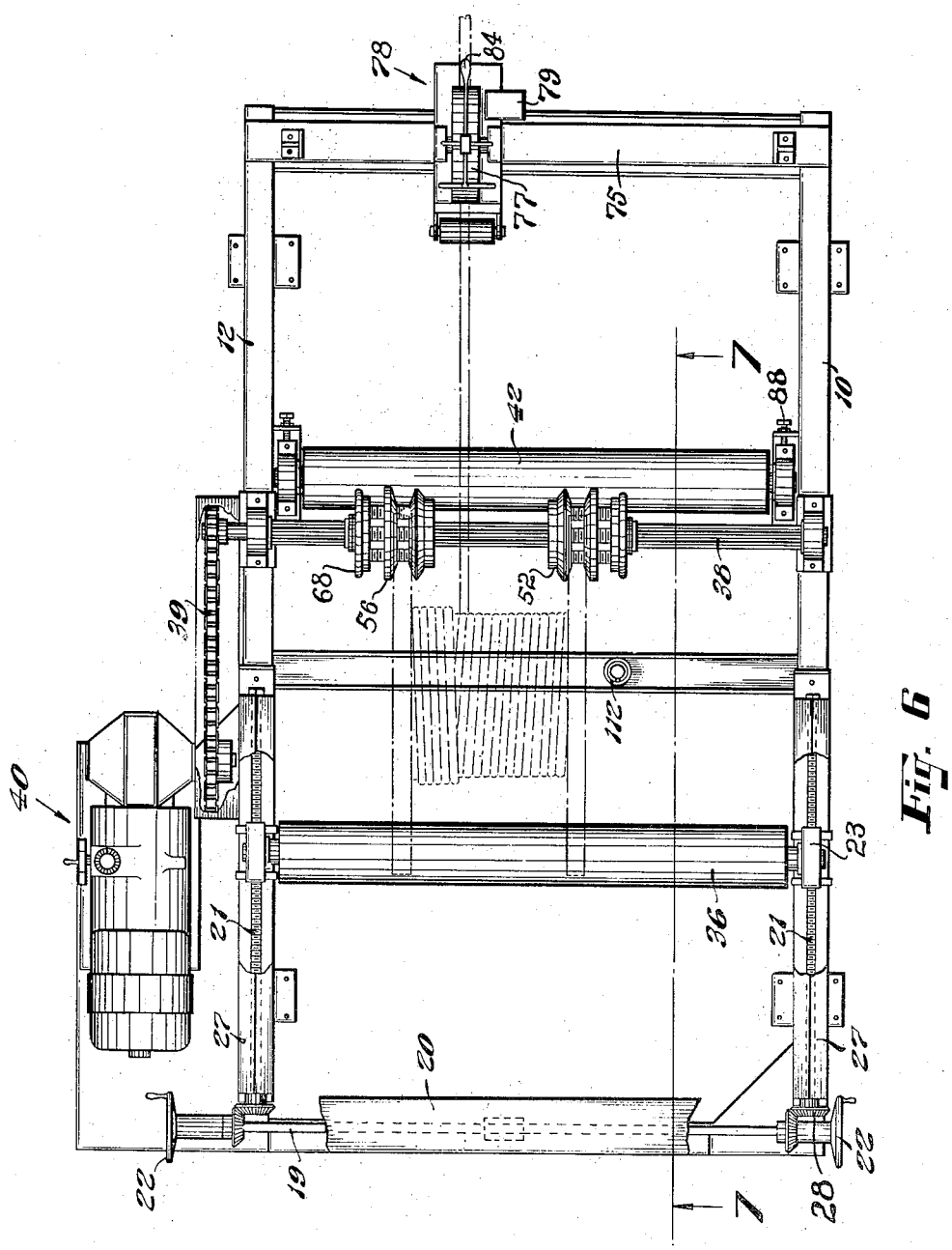
Figure 7:
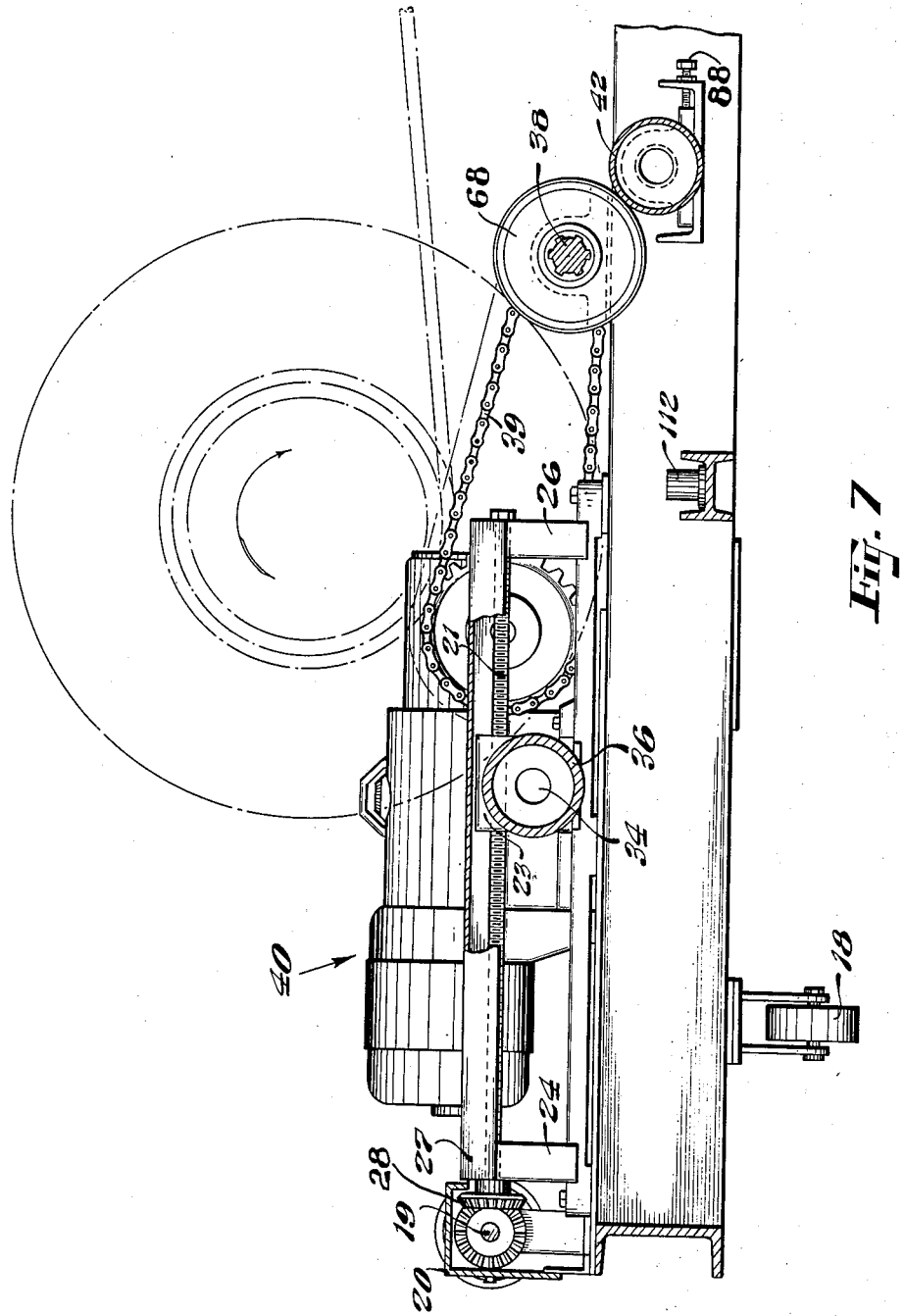

These and other objects and features of the invention will be more readily understood and appreciated from the following detailed description of a preferred embodiment thereof selected for purposes of illustration and shown in the accompanying drawings, in which:

Fig. 1 is a view in perspective of a machine constructed in accordance with the invention and set up to wind cable upon a conventional reel, Fig. 2 is a fragmentary view in perspective illustrating the operation of forming a coil upon a reel having a demountable side flange, Fig. 3 is a view in end elevation of the driving pulley, Fig. 4 is a view partly in side elevation and partly in cross-section of a driving pulley, Fig. 5 is a view in cross-section along the line 5—5 of Fig. 4, Fig. 6 is a plan view of the apparatus, and Fig. 7 is a view in cross section along the line 7—7 of Fig. 6.

The apparatus of my invention is organized about an elongated rectangular frame including longitudinal I-beams 10 and 12 and shorter end beams 14 and 16. The frame is carried on four or more stout casters 18 by means of which the apparatus may be trundled from place to place about a warehouse or other establishment. At one end of the frame the I-beam 16 supports an elongated box or casing 20 and bearings for a transverse shaft 19 disposed within the casing 20 and having at each end a hand wheel 22. On the upper surface of each of the long I-beams 10 and 12 and adjacent the ends of the shaft 19 there is placed a pair of spaced bearing standards 24 and 26 in which is journaled a longitudinally extending lead screw 21 terminating at one end in a bevelled gear 28 meshing with a similar gear secured to the shaft 19. It will now be understood that when either of the hand wheels 22 is rotated, the lead screws 21 are correspondingly rotated. Each of the lead screws 21 passes through threaded blocks 23 which slide on the surfaces of the I-beams 10 and 12 and also serve as bearings for the ends of a shaft 34 carrying a heavy steel roller 36. Each of the lead screws is housed by casing 27 upon the outer surface of one of which is placed a scale plate 29 bearing markings adapted to register with a pointer 31 carried upon one of the blocks 23.

The rotation of the lead screws 21 serves to move the blocks 23, with the roller 36, longitudinally along the frame of the apparatus, and a predetermined adjustment may be made by rotating one of the hand wheels 22 until the pointer 31 registers a precalculated position with respect to the scale plate 29.

Mounted for rotation in the frame parallel to the roller 36 is a splined shaft 38 coupled at one end by a sprocket wheel and chain 39 to a variable speed drive unit 40. The details of the variable speed driving unit form no part of the present invention, but I have successfully used a unit manufactured by The Master Electric Company and sold under the trade-mark "V-34 Speedranger," as described on its data sheet published October 1, 1940. However, those skilled in the are will readily appreciate that there are many drive units available which may be employed for the purpose.

An idler roll 42 is mounted for rotation between the frame members 10 and 12 parallel to the adjacent splined shaft 38. A cable reel 46 of conventional form may be disposed so that its weight is borne partly by the steel roller 36 and partly by variable face V-pulleys engaging the edges of the end disks of the reel and mounted upon the splined shaft 38. Inasmuch as the V-pulleys here employed are of novel construction, I shall proceed to a detailed description thereof. Each pulley comprises a central hub member 50 cut with longitudinal grooves to fit the splines on the shaft 38, terminating at one end in scalloped disk portion and at the other end in an externally threaded portion. The exterior surface of the hub 50 is also provided with longitudinal splines to receive, first, a disk 52 which is brought into contact with the scalloped end plate and bolted thereto by a series of bolts 54. A second disk 56 slides on the splines of the hub 50 and is provided with a series of threaded holes to receive a plurality of lead screws 58. Each lead screw has a reduced end extending through the disk 52 and terminating in a threaded further reduced terminal portion which receives a lock nut 60. An annular casing 62 surrounds the exposed nuts 54 and 60 and is screwed to the end surface of the disk 52 by a series of machine screws 64.

A flat disk 66 slides on the splines of the hub 50 and butts against shoulders formed thereon, while a hand wheel 68 fits over the hub 50, is free for rotation thereon, butts against the disk 66, and has an internal face provided with gear teeth 70 which mesh with pinions 72 integral with the ends of the lead screws 58. A collar 74 threads over the threaded end of the hub 50 and serves to lock the hand wheel 68 and the disk 66 against axial movement upon the hub, while permitting rotation of the hand wheel.

When the hand wheel 68 is rotated, the internal gear 70 causes rotation of the individual pinion 72 and the lead screws 58. Inasmuch as the disk 56 cannot rotate with respect to the hub 50, the rotation of the lead screws 58 causes the disk 56 to move longitudinally along the hub 50. The disks 56 and 52 are formed with opposed inwardly converging surfaces and thereby form a variable faced V-pulley.

Before a reel is placed on the apparatus, the thickness of its end disks is measured and the two V-pulleys adjusted by means of the hand wheels until the peripheries of the ends of the reel just fit between the disks 52 and 56. The spacing must, of course, be wide enough to accept the end of the reel, but it should be pointed out that if the spacing is too wide, the reel end will penetrate the pulley and limit thereby the diameter of the coil which may be wound upon the reel.

Also, before the reel 46 is placed on the apparatus, the hand wheels 22 are rotated until the spacing between the shaft 38 and the roller 36 is properly proportioned to the diameter of the ends of the reel. Then when the drive unit 40 is rotated the rotation of the shaft 38 will cause rotation of the reel. The drive unit 40 is reversible so that the cable may be either wound upon or be taken from the reel 46.

The purpose of the roll 42 is to back up the shaft 38. That is to say, the peripheries of the disks 52 and 56 of each V-pulley run upon the surface of the roll 42 so that the weight of the reel is not taken entirely by the drive shaft 38 but is distributed to the roll 42. The roll 42 is mounted in brackets projecting inwardly from the side beams 10 and 12 and its bearings may be adjusted by adjusting screws 88 so as to bring the roll into supporting relation with the disks 52 and 56.

Upon the end frame member 14 I secure an I-beam 75 upon which is mounted a frame 78 having a cross section in the shape of an inverted U and containing a pair of cross shafts 80 each of which in turn carries a pair of flanged rollers 81 which run on the top of the I-beam 75. These rollers and the shafts 80 turn upon horizontal axes. At the bottom of each side of the U-frame 78 I secure a pair of rollers (not shown) mounted on vertical axes and bearing against the sides of the I-beam 75. It will therefore be evident that the frame 78 may travel freely back and forth along the I-beam 75 as the cable travels back and forth on the reel. Upon the top of the frame 78 I mount a conventional two-wheel wire measuring unit, the details of which form no part of the present invention. I have found that a unit manufactured by Durant Mfg. Co., Type L, is eminently satisfactory for the purpose. Such a unit consists essentially of a small bottom wheel 76, a large wheel 77 mounted above it, with suitable guides 82 for leading a wire or cable between the wheels and also having a counter 79 responsive to the rotation of the upper wheel 77 and, in effect, measuring the travel of the wheel periphery, thus providing an accurate measure of the amount of wire cable or rope drawn between the two wheels.

The upper wheel 77 is mounted in vertically sliding bearings that are connected to an overhead lever 84 by which the wheel 77 may be manually lifted to facilitate threading the measuring unit. As the cable is wound on or unwound from the reel 46 it reacts with the guides 82 causing the unit to move transversely and locate itself always in line with the cable leaving or passing to the reel. The guides 82 may be adjusted transversely to accommodate cables of different diameter and locked in adjusted position by clamps 85.

In operating the device one of the hand wheels 22 is rotated to provide proper spacing between the shaft 38 and the roller 36 with respect to the size of the reel to be employed. The V-pulleys are adjusted to receive the ends of the reel. Then the reel is placed so that it rests upon the roller 36 and upon the V-pulleys. The cable, wire, rope, or other generally filamentary material is then led through the measuring unit, and the drive unit 40 is operated at proper speed in the required direction either to reel or unreel the cable.

In Fig. 2 I have shown a modified version suitable for forming cable, wire, or rope into coil form. I employ a small I-beam 110 between the frame members 10 and 12 and between the shaft 38 and the roller 36. Upon the I-beam 110 I mount a socket 112 to receive a vertical standard 114 at the upper end of which there is secured a clamp comprising a triangular bracket 116 at the top of which a bar 118 is hinged about a pivot point 120. A strap 122 is passed over the bar 118 and secured to the lower member of the bracket 116 by a spring, while the outer end of the bar 118 is provided with a knob 124 and an inwardly turned lip 125. In practice the bar 118 is raised against the action of the spring and then slipped over the rim 126 of a skeleton reel to hold the reel in tilted position so that the opposite end 128 of the reel may be removed from the axle and a coil wound thereon slipped freely off the reel. Thus, the skeleton reel may be employed just as the reel 46 in Fig. 1 to wind a coil of desired length. When the reeling has been accomplished, the reel is tilted and engaged with the clamp so that the wound coil may be removed.

Having thus disclosed my invention what I claim as new and desire to secure by Letters Patent is:

1. Cable handling apparatus comprising a frame, a pair of shafts mounted in parallel and spaced apart relation for rotation in the frame and with provision for variation in their spacing, a pair of V-pulleys each having opposed faces and being splined slidably upon the first of said shafts, means for varying the space between opposed faces of said V-pulleys, and means for driving said first shaft.

2. Cable handling apparatus comprising a frame, a roll mounted in the frame, a shaft mounted parallel to said roll for rotation in said frame, cable reeving and measuring mechanism mounted to slide on said frame parallel to said shaft, a pair of variable face pulleys mounted to slide on said shaft but locked against rotation thereon, and means for driving said shaft.

3. Cable handling apparatus comprising a frame, a roll mounted in the frame, a shaft mounted parallel to said roll for rotation in said frame, cable reeving and measuring mechanism mounted to slide on said frame parallel to said shaft, a pair of variable face pulleys mounted to slide on said shaft but locked against rotation thereon, and variable speed means for driving said shaft.

4. A machine for winding cable to and from a reel having end flanges, comprising a frame, an idler roll rotatably mounted in the frame, a shaft journalled in said frame, a pair of V-pulleys slidably mounted on said shaft, and means for varying the space between the faces of each V-pulley to accommodate reels having different flange thicknesses.

5. A machine for winding and measuring cables or the like, comprising a rectangular frame having a transverse reel supporting shaft mounted thereon for rotation about a fixed axis, a co-operating reel-supporting roller mounted on the frame for bodily movement toward and from said shaft, adjusting means located at one end of the frame for controlliing the position of said roller, and a measuring unit mounted for free transverse movement at the other end of the frame in a direction parallel to the axis of a reel rotatably supported by said shaft and roller.

6. Cable handling apparatus comprising a frame, a roll mounted in said frame, a shaft mounted for rotation in said frame in a position parallel to said roll, a pair of V-pulleys mounted on said shaft and having relatively movable opposed disks running on said roll, means for adjusting said movable disks, means keying said pulleys to said shaft for sliding movement thereon, and means for driving said shaft.

7. Cable handling apparatus comprising a frame, a roll, means mounting the roll for rotation in the frame and for bodily movement at right angles to the axis of the roll, a shaft rotatably mounted in said frame parallel to said roll, a pair of variable face pulleys splined to slide on said shaft and run upon said roll, means for driving the shaft, and mechanism for reeving and measuring cable mounted to slide on said frame in a direction parallel to said shaft.

References Cited in the file of this patent

UNITED STATES PATENTS

| Number | Name | Date |
|---|---|---|
| 1,159,165 | Brassington | Nov. 2, 1915 |
| 1,180,867 | Milne | Apr. 25, 1916 |
| 1,282,618 | Neidich | Oct. 22, 1918 |
| 1,437,915 | Sentou et al. | Dec. 5, 1922 |
| 1,455,976 | Stevens | May 22, 1923 |
| 2,039,250 | Junge | Apr. 28, 1936 |
| 2,421,347 | Merwin | May 27, 1947 |